(12) United States Patent
Lor

(10) Patent No.: US 6,201,562 B1
(45) Date of Patent: Mar. 13, 2001

(54) INTERNET PROTOCOL VIDEO PHONE ADAPTER FOR HIGH BANDWIDTH DATA ACCESS

(76) Inventor: Kar-Wing E. Lor, 25605 Crestfield Dr., Castro Valley, CA (US) 94552

( * ) Notice: Subject to any disclaimer, the term of this patent is extended or adjusted under 35 U.S.C. 154(b) by 0 days.

(21) Appl. No.: 09/338,919

(22) Filed: Jun. 23, 1999

Related U.S. Application Data

(60) Provisional application No. 60/106,494, filed on Oct. 31, 1998.

(51) Int. Cl.$^7$ ..................................................... H04N 7/14
(52) U.S. Cl. ................................... 348/14.01; 348/14.04; 379/93.21
(58) Field of Search ................................. 348/14, 15, 12; 379/93.05, 93.06, 93.17, 93.21, 93.23; 455/6.3, 5.1; 370/353, 354, 355

(56) References Cited

U.S. PATENT DOCUMENTS

| | | |
|---|---|---|
| 5,189,691 | 2/1993 | Dunlap . |
| 5,191,601 | 3/1993 | Ida et al. . |
| 5,204,893 | 4/1993 | Choi et al. . |
| 5,280,540 | 1/1994 | Addeo et al. . |
| 5,345,258 | 9/1994 | Matsubara et al. . |
| 5,374,952 | 12/1994 | Flohr . |
| 5,534,914 | 7/1996 | Flohr et al. . |
| 5,550,754 | 8/1996 | McNelley et al. . |
| 5,568,183 | 10/1996 | Cortjens et al. . |
| 5,587,735 | 12/1996 | Ishida et al. . |
| 5,592,540 | 1/1997 | Beveridge . |
| 5,675,375 | 10/1997 | Riffee . |
| 5,677,727 | 10/1997 | Gotoh et al. . |
| 5,737,321 | 4/1998 | Takahashi . |
| 5,745,161 | 4/1998 | Ito . |
| 5,760,824 | 6/1998 | Hicks, III . |
| 5,790,180 | 8/1998 | Wild . |
| 5,818,514 | 10/1998 | Duttweiler et al. . |
| 5,821,986 | 10/1998 | Yuan et al. . |
| 5,838,917 | 11/1998 | Paolini . |
| 6,020,916 | * 2/2000 | Gerszberg et al. ............... 379/93.17 |

FOREIGN PATENT DOCUMENTS

| | | |
|---|---|---|
| 024 618 | 3/1981 | (EP) . |
| 310 477 | 4/1989 | (EP) . |
| 348 623 | 1/1990 | (EP) . |
| 2219464 | 12/1989 | (GB) . |
| 2237709 | 5/1991 | (GB) . |
| WO 92/10038 | 6/1992 | (WO) . |

OTHER PUBLICATIONS

Lawton, Paving information superhighway's last mile, IEEE, Computer, Apr. 1998.*

* cited by examiner

*Primary Examiner*—Duc Nguyen
*Assistant Examiner*—Melur Ramakrishnaiah
(74) *Attorney, Agent, or Firm*—Richard C. Litman

(57) ABSTRACT

A global information network protocol videophone adapter system that provides telephony for residential users with high bandwidth data access. The system has the features of a conventional video telephone that uses regular telephone lines, but offers an improved video quality due to the availability of higher bandwidth data. Only a television set, a video camera and a microphone are necessary as adjunct devices to the adapter device. The adapter device should be connected to a cable modem or an Asynchronous Digital Subscriber Line modem for a high bandwidth network access.

7 Claims, 6 Drawing Sheets

INTERNET PROTOCOL VIDEO PHONE ADAPTER FOR HIGH BANDWIDTH DATA ACCESS

CROSS-REFERENCE TO RELATED APPLICATION

This application claims the benefit of U.S. Provisional Patent Application Ser. No. 60/106,494, filed Oct. 31, 1998.

BACKGROUND OF THE INVENTION

1. Field of the Invention

The present invention relates generally to a global information network protocol video phone adapter device and an Internet Protocol Videophone Adapter system that provides video telephony for residential users with high bandwidth data access. More specifically, the economical invention has the features of a conventional video telephone that uses regular telephone lines, but offers an improved video quality due to the availability of higher bandwidth data.

2. Description of Related Art

The related art of interest describes various expensive plain old telephone system (POTS) video telephones and video conferencing systems. These video conferencing systems mainly use the Integrated Services Digital Network (ISDN) lines as their transport. However, the ISDN lines are not built as internet protocol telephony devices that take advantage of the internet network as an economical alternative of long distance carriers. Moreover, the pricing of these systems are too costly for residential use. Therefore, there is a need for a telephone device using this system for minimizing the cost of installation and operation. The related art will be discussed in the order of perceived relevance to the present invention. The relevant art neither teaches nor suggests the present invention.

U.S. Pat. No. 5,675,375 issued on Oct. 7, 1997, to Robert K. Riffee describes a home videoconferencing system and a method of use. The system comprises a television receiver, a camcorder, a video controller, an audio controller, a system controller, a modem, and analog telephone lines. The video controller is connected to the camcorder which receives the video signals from the camcorder. The video controller converts the standard outgoing video signals into compressed digital video signals. The video controller receives compressed incoming digital video signals which are converted into standard incoming video signals for output to the television receiver. The video controller stores a number of compression and decompression programs in a memory device. The audio controller is a digital signal processor connected to the camcorder and the television receiver. The audio controller receives the standard outgoing audio signals from the camcorder and the compressed incoming digital audio signals. The audio controller converts the standard outgoing signals into compressed digital audio signals and converts the incoming compressed digital audio signals into standard television audio signals for audio output on the television receiver. The audio controller stores a number of compression and decompression programs in a memory device. The system controller is connected to the modem, the video controller and the audio controller. The system controller receives the outgoing compressed digital video signals and the outgoing compressed digital audio signals from the video and audio controllers and multiplexes the compressed outgoing digital video and audio signals into outgoing system digital signals. Similarly, the system controller demultiplexes incoming system signals and couples the incoming compressed audio digital signals to the audio controller and couples the incoming compressed digital video signals to the video controller. The modem is coupled to a standard analog telephone line and to the system controller. The modem is controlled by the system controller and converts the outgoing system digital signals into outgoing standard telephone signals for transmission on the telephone lines and vice versa. The system is distinguishable for balancing image sharpness and the video frame for a fixed bandwidth for a video pixel quantization level which is not required in the present invention in order to obtain sharp video pictures by basing the inventive system on available high bandwidth transmission.

U.S. Pat. No. 5,838,917 issued on Nov. 17, 1998, to Michael J. Paolini describes a dual connection interactive video based communication system which provides apparatus and methods for user guided information retrieval in video frame format and the transmission of the selected and retrieved information to a remote location for review and analysis. The storage of audio information in video frame format permits real time information compression which allows a minute presentation to be transmitted in less than a second. The telephone service input through a modem permits the service operator to configure and authorize the receiver to receive the transmitted data by sending the authorization code to be temporarily stored in the receiver. The system is distinguishable as being based on video, high definition television, microwave broadcast, cable, UHF/VHF and satellite systems.

U.S. Pat. No. 5,821,986 issued on Oct. 13, 1998, to Xiancheng Yuan et al. describes a videoconferencing method and apparatus for visual communications in a scalable network environment. A camera inputs data to a video input/output system and displays video on a display monitor. A video codec compresses video digital information received from the video input/output system and communicates with a network transport system. Audio information is also communicated to the network transport system by an audio system receiving analog audio signals from a microphone and transported back from the network transport system to a speaker via analog signals. The video codec and the audio processing system are implemented using the personal computer's central processing unit, bus, memory and network interface. The scalable encoding of an image sequence for transmission onto the network enables the encoded image sequence to be decoded at any one of at least two spatial resolutions and at any one of at least two frame rates. The decoder can select to decode the received image at any of the available spatial resolutions and at any of the available frame rates. The decoded images can be displayed for viewing on the computer monitor at the desired spatial resolution level and frame rate. The system is distinguishable for the lack of a telephone communication link.

U.S. Pat. No. 5,818,514 issued on Oct. 6, 1998, to Donald L. Duttweiler et al. describes a videoconferencing system and method for providing enhanced interactive communication. A line interface is connected to an integrated services digital network (ISDN) by a bus. Image and sound signals of 64 kbps (48 kbps image+16 kbps sound) are multiplexed. The interface in turn is connected to a separation circuit in one leg which connects the loudspeaker, a CAT monitor and a notification circuit. A second leg includes a synthesizer circuit which contains an audio coding circuit connected to a microphone, an image coding circuit connected to a camera, and a speech detector. The videoconferencing system is distinguishable for its reliance on the ISDN.

U.S. Pat. No. 5,790,180 issued on Aug. 4, 1998, to Ronald L. Wild describes a video telephone call handling system and method based on a combination of standard audio telephone lines and video cable television lines. A person with a video telephone can still call a person without a video telephone but has cable television service, and involves a call transfer service and a video telephone unit. Also, protocol conversion is used to allow a caller and a recipient, each having incompatible telephone equipment, to freely communicate with one another. Radio frequencies are utilized but the system is still distinguishable for requiring video telephones and video cable television lines.

U.S. Pat. No. 5,760,824 issued on Jun. 2, 1998, to John A. Hicks, III describes a multimedia telephone system having a wireless camera and television module, and a method of operation thereof. The system contains a first and second module for a sender which includes a handset-speakerphone, a keypad unit interface, and user interface controls in the first module, and a video camera and a television set in the second module. In an alternative embodiment, the network interface, the telephone circuitry, the microprocessor, "intelligence", and the audio/video CODEC are relocated to the second module. The transmission between modules is by radio frequency signals. The multimedia telephone system is distinguishable for reliance on video telephones and radio frequency transmissions.

U.S. Pat. No. 5,745,161 issued on Apr. 28, 1998, to Kan Ito describes a video conference system arranged to conduct a video conference among multiple points by communicating images and sounds and controlling the movement of the camera. The conference system includes a monitor for displaying moving images obtained from a plurality of stations on individual screens, a pointing device for selecting one station, and a controller for operation of a camera in a selected station. The conference system is distinguishable for its plurality of stations and control of the cameras.

U.S. Pat. No. 5,737,321 issued on Apr. 7, 1998, to Eiichiro Takahashi describes a multi-media teleconference system. The improvement appears to be the addition of a telephone terminal and a data distinguishing section at the broadcasting communication or multi-casting point. The system is distinguishable for its limitation to video transmissions.

U.S. Pat. No. 5,677,727 issued on Oct. 14, 1997, to Hiroshi Goto et al. describes a television telephone or videophone with a movable head. Communication between three persons is shown including a videophone for user A which is connected by cables to user B's camera, monitor with a speaker, and a telephone, and connected to user C by an ISDN network. The movable head videophone system is distinguishable for its direct exclusive line connections.

The following patents are noted as further art of interest.

U.S. Pat. No. 5,592,540 issued on Jan. 7, 1997, to Gregory J. Beveridge describes a method and apparatus for selectively delivering telephony signals on a hybrid coaxial cable network.

U.S. Pat. No. 5,587,735 issued on Dec. 24, 1996, to Kiyoshi Ishida et al. describes a video telephone.

U.S. Pat. No. 5,568,183 issued on Oct. 22, 1996, to Leo. M. Cortjens et al. describes a network videoconferencing system.

U.S. Pat. No. 5,550,754 issued on Aug. 27, 1996, to Steve McNelley et al. describes a teleconferencing camcorder.

U.S. Pat. No. 5,534,914 issued on Jul. 9, 1996, to Daniel P. Flohr et al. describes a videoconferencing system.

U.S. Pat. No. 5,374,952 issued on Dec. 20, 1994, to Daniel P. Flohr et al. describes a videoconferencing system.

U.S. Pat. No. 5,345,258 issued on Sep. 6, 1994, to Atsushi Matsubara et al. describes a videophone having an automatic answering capacity.

U.S. Pat. No. 5,280,540 issued on Jan. 18, 1994, to Eric J. Addeo et al. describes a video teleconferencing system employing aspect ratio transformation.

U.S. Pat. No. 5,204,893 issued on Apr. 30, 1993, to Hyun J. Choi et al. describes a method and an apparatus for transmitting and receiving signals in a video phone.

U.S. Pat. No. 5,191,601 issued on Mar. 2, 1993, to Takashi Ida et al. describes a video phone unit.

U.S. Pat. No. 5,189,691 issued on Feb. 23, 1993, to R. Terren Dunlap describes a video cassette recorder with a video phone answering capability.

E.P.O. Application No. 24,618 published on Aug. 11, 1979, for Helmut Bauch describes a wide band long distance system.

E.P.O. Application No. 310,477 published on Apr. 5, 1989, for Jacques Guichard et al. describes a communication terminal with visual communication.

E.P.O. Application No. 348,623 published on Jan. 3, 1990, for Kohji Ogawa et al. describes a videophone with a detachable camera.

P.C.T. Application No. WO 92/10038 published on Jun. 11, 1992, for Michael P. Harney et al. describes a CATV pay per view interdiction system method and apparatus.

U.K. Application No. 2,219,464 published on Dec. 6, 1989, for Satoru Maeda et al. describes the transmission of a still picture with a reduced bandwidth.

U.K. Application No. 2,237,709 published on May 8, 1991, for William H. Powell describes an optical fiber and coaxial cable network which provides cordless telephony, etc.

None of the above inventions and patents, taken either singly or in combination, is seen to describe the instant invention as claimed.

SUMMARY OF THE INVENTION

The present invention is directed to an Internet protocol videophone adapter system that provides video telephony for residential users with high bandwidth data access. The system has the features of a conventional video telephone that uses regular telephone lines, but offers an improved video quality due to the availability of higher bandwidth data.

Accordingly, it is a principal object of the invention to provide a global information network protocol based videophone adapter system.

It is another object of the invention to provide a videophone adapter system based on high bandwidth data access.

It is a further object of the invention to provide a videophone adapter system behaving as a video telephone with improved video quality.

Still another object of the invention is to provide a videophone adapter system which is economical and obviates the need for a personal computer and a monitor by a residential user.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a device which utilizes the services of the Internet or any global information network which many residential people already use. Instead of relying on a multimedia personal computer, monitor and an analog phone device, the adapter device performs the hardware related functions of video and audio capture, video and audio output, and interfaces with ETHERNET® (a local area data network). The software related functions include compression of audio and video signals, Internet protocol connection, call initiation and reception, packetization, and the transmission and reception of audio and video signals.

A call using an IPVPA has, at the minimum, full-duplex audio signals between the two parties, while the video path is optional. If both parties have video capture equipment, i.e., video camera or camcorder, then this call can also have full-duplex video. If neither party has video capture equipment, then the call is only an audio call. However, if one party has no video capture equipment but only a television set, it is still possible for this party to receive video signals from the other party having a camera. This setup arrangement is particularly useful when only unidirectional video is necessary, e.g., a sales representative demonstrating a product to a potential customer, distance learning and the like. Since an IPVPA is addressed by a 10 digit phone number, the system can also make calls to or receive calls from an ordinary telephone in the public switch telephony network (PSTN), in the form of an audio only call.

Figure 1:
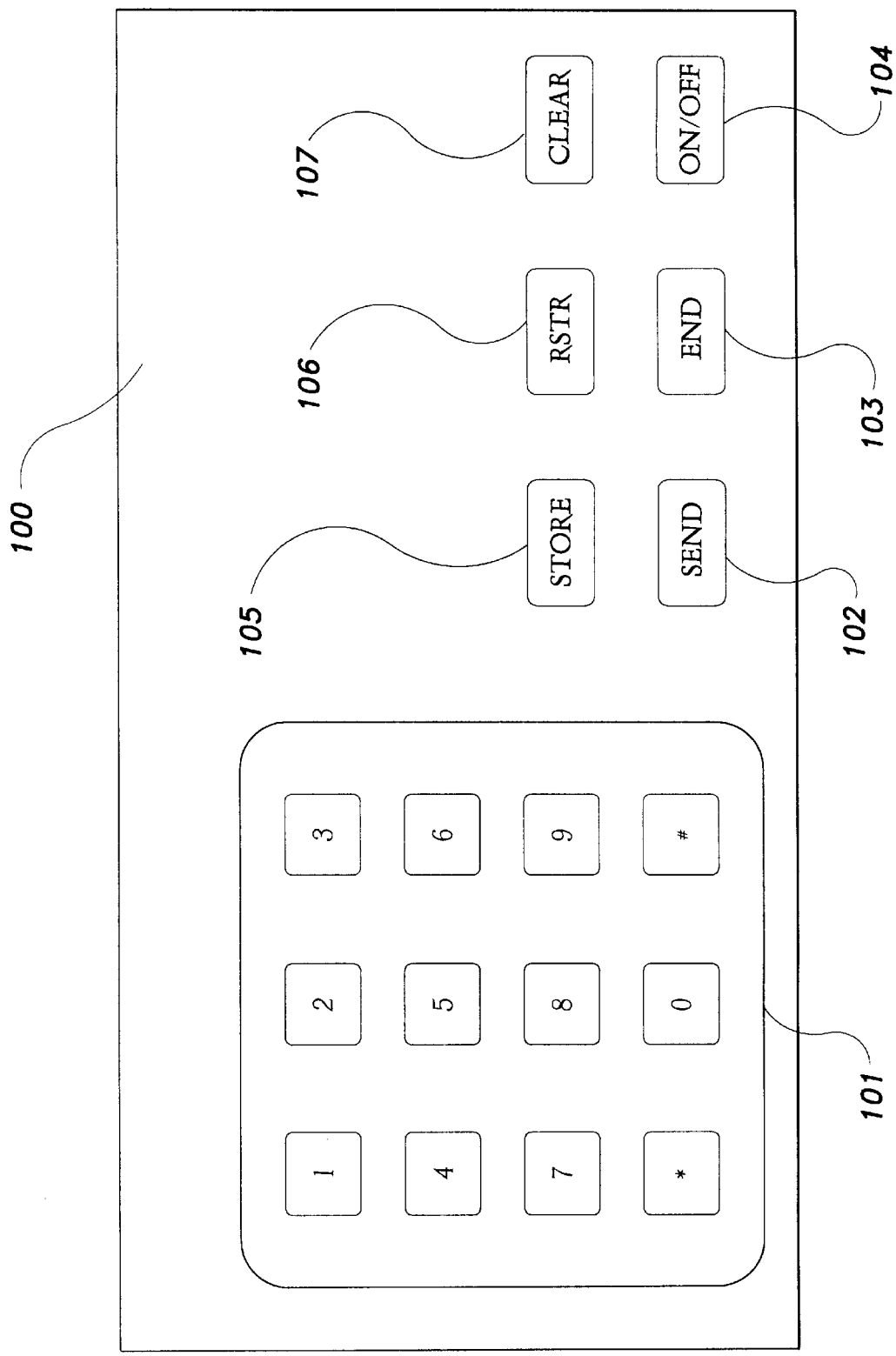
FIG. 1 is a schematic top plan view of a numeric keypad and conventional cellular phone command buttons for the Internet Protocol Video Phone Adapter (IPVPA) system device with high bandwidth data access according to the present invention.
Figure 2:
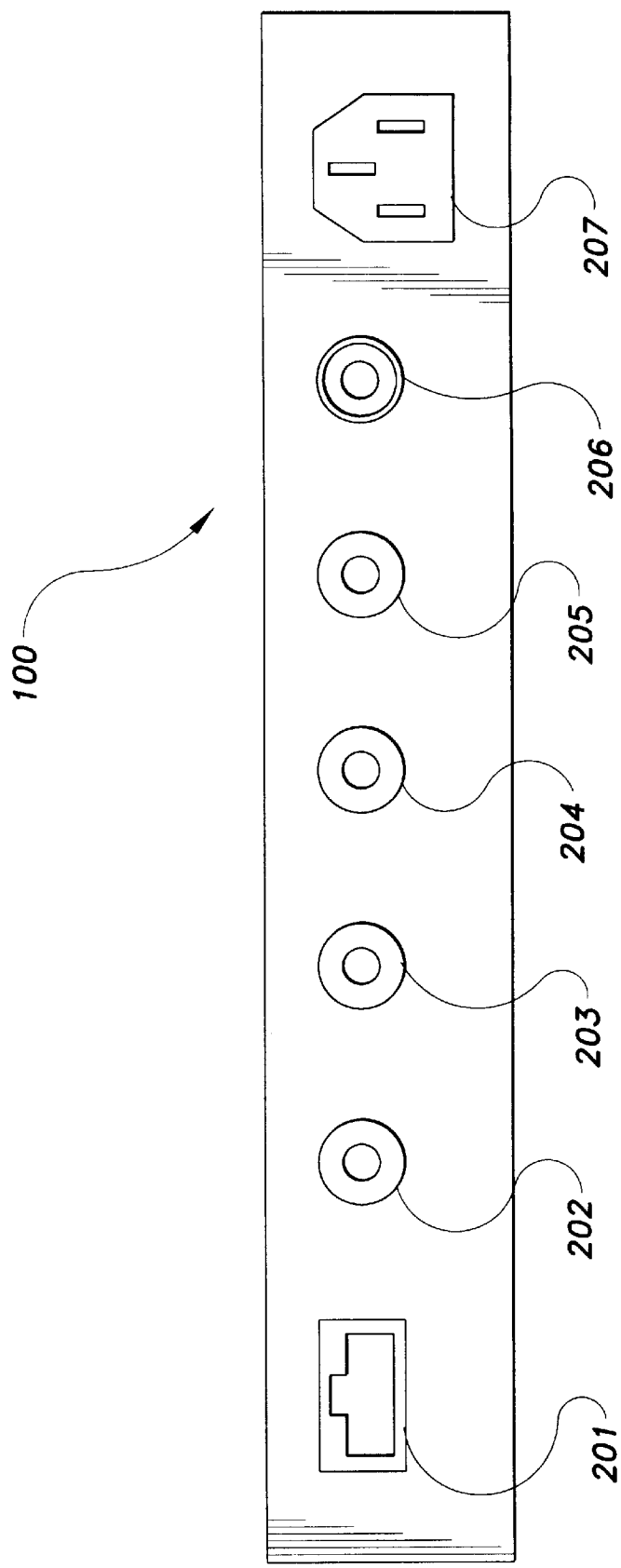
FIG. 2 is a schematic rear view of the IPVPA device showing seven outlets for connections to various appliances and the power source.
Figure 3:
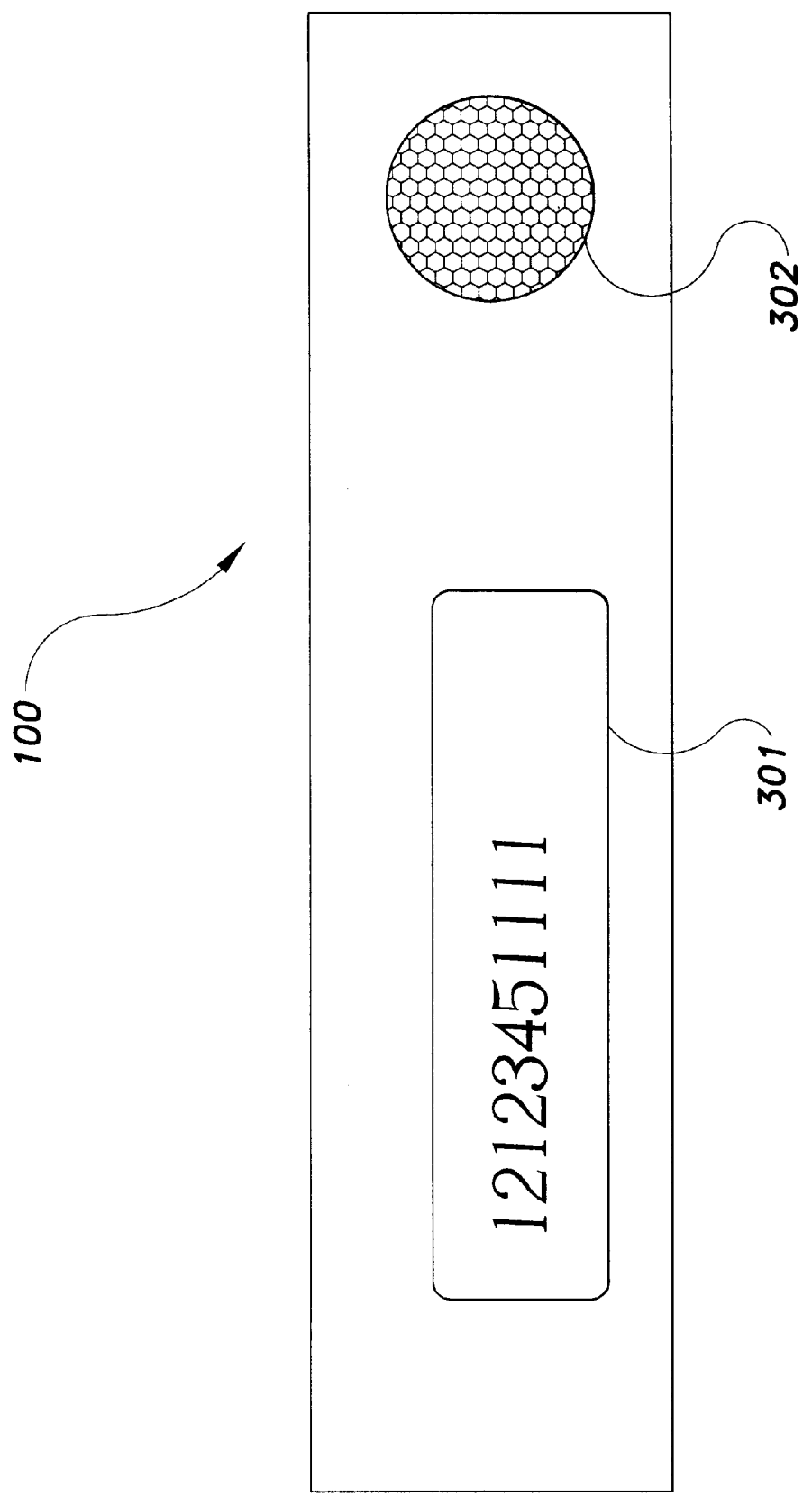
FIG. 3 is a front elevational view of the IPVPA device showing the destination number of an outbound call and a speaker element.

In FIGS. 1, 2 and 3, the respective top, rear and front views of an Internet protocol video phone adapter (IPVPA) device 100 are illustrated. Referring to FIG. 1 and the control keys, a numeric keypad 101 is available to enter the phone number in an outbound call. The "SEND" button 102 is pushed in after entering the phone number. If an inbound call is signaled, the same button is pushed in to accept the call. An "END" button 103 terminates a telephone call. These buttons and their circuitry are conventional in cellular phones. The "ON/OFF" button 104 powers the device 100 on and off. The "STORE" button 105 stores the telephone number of the calling or called party in a memory unit. The "RSTR" (or restore) button 106 restores a telephone number in the memory unit for speed dialing. The "CLEAR" button 107 erases the previously entered digit when entering a destination number.

Referring to FIG. 2, the rear of the IPVPA device 100 is depicted to show the various electrical connection junctions. An RJ-45 jack 201 is connected to an asynchronous digital subscriber line (ADSL) modem or a cable modem. The RCA jack 202 is a video output connection. The RCA jack 203 is a video input connection. The RCA jack 204 is an audio output. The RCA jack 205 is for amplified audio input from an audio source like a camcorder or video camera. As an alternative, jack 206 is a 3.5 mm. mini stereo jack for an unamplified audio input like a desktop microphone. Jack 207 is a power jack and connected to A.C. power.

Referring to FIG. 3, a front view of the IPVPA device 100 shows a liquid crystal display (LCD) 301 indicating 11 digits (destination telephone number) and an internal speaker or ringer 302.

Figure 5:
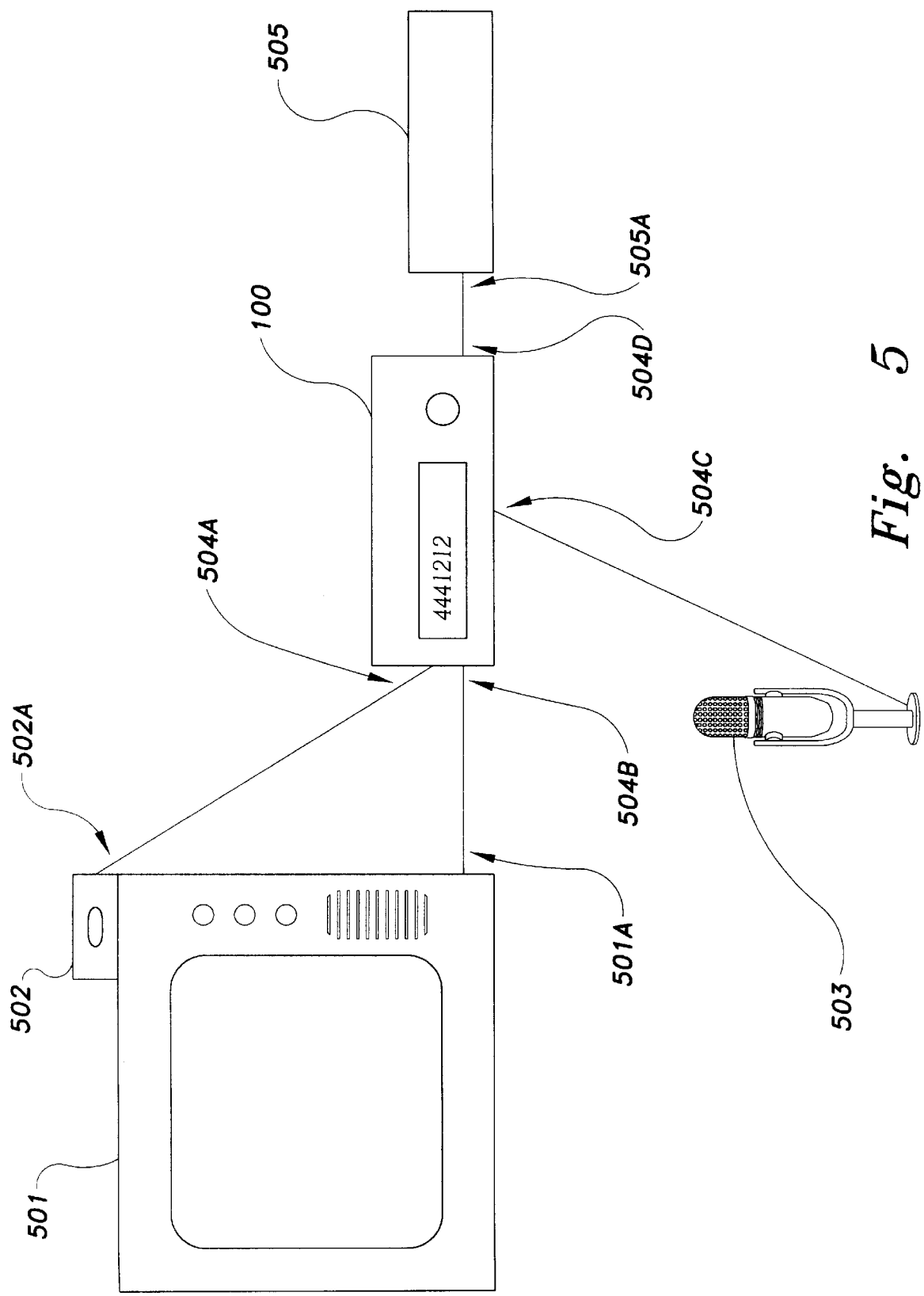
FIG. 5 is a schematic diagram of the appliances in the IPVPA system.

To set up the IPVPA device 100 with reference to FIGS. 2 and 5, a power cord (not shown) is used to connect the power outlet 207 to an A.C. electrical power outlet. The RJ-45 jack 201 is connected at connection 504D to either a cable modem or the ADSL modem 505 by another RJ-45 connection 505A. The video output jack 202 and the audio output jack 204 of the device 100 are connected by a pair of audio and video connection cables to the audio and video input jacks of a television set 501, as shown in connection 504B to 501A. If an unamplified microphone is used, the microphone 503 is plugged into the 3.5 mm. mini-stereo jack 206 of the IPVPA device 100, as shown by connection 504C. For video input, the video output of a desktop video camera 502 is fed to the video input jack 203, as shown in the connections 502A to 504A. To use the television set as an output device, the video mode must be used. For a television set 501 without video input but only coaxial input, an intermediate device like a videocassette recorder (VCR) is required to combine the video and audio signals into one channel, e.g. channel 3, in the VCR's coaxial output before being fed to the TV.

Figure 4:
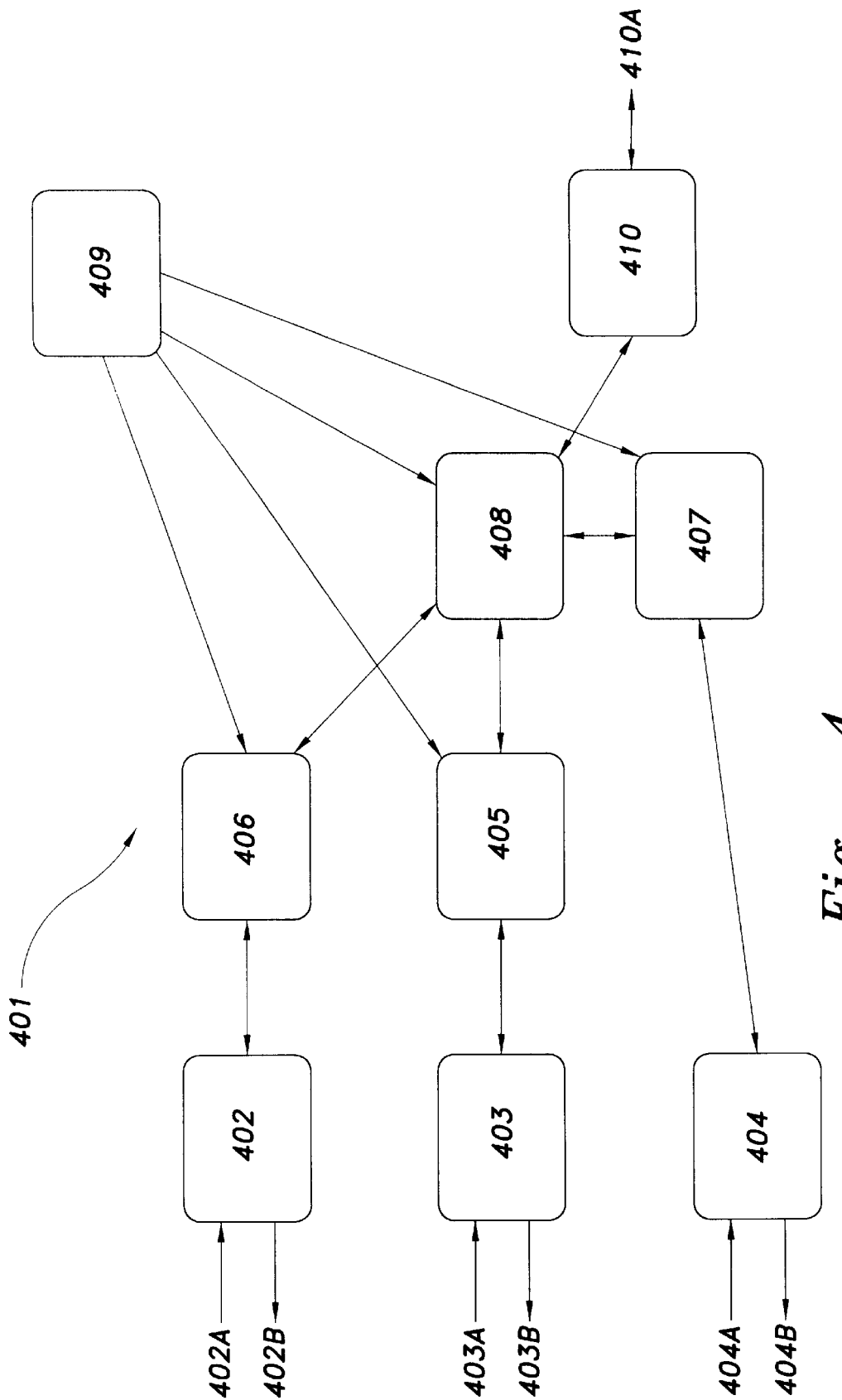
FIG. 4 is a functional block diagram of the IPVPA system, wherein a functional block can be either a hardware component or a software process.

Since the IPVPA device 401 (equivalent to device 100) in FIG. 4 is an Internet based device, the unit is actively powered by the ON button 104 to acquire a dynamic Internet protocol (IP) address from the dynamic host configuration protocol (DHCP) server (not shown). The IP address stays with the device 401, simply a DHCP client, as long as the device is powered on. For a device 401 powered on and connected to the network, the message "READY" is displayed on the LCD screen as on a cellular phone. The main control 409 as the main software processor in the device 401 is activated. The main control 409 in turn activates the other major processes in the system.

Figure 6:
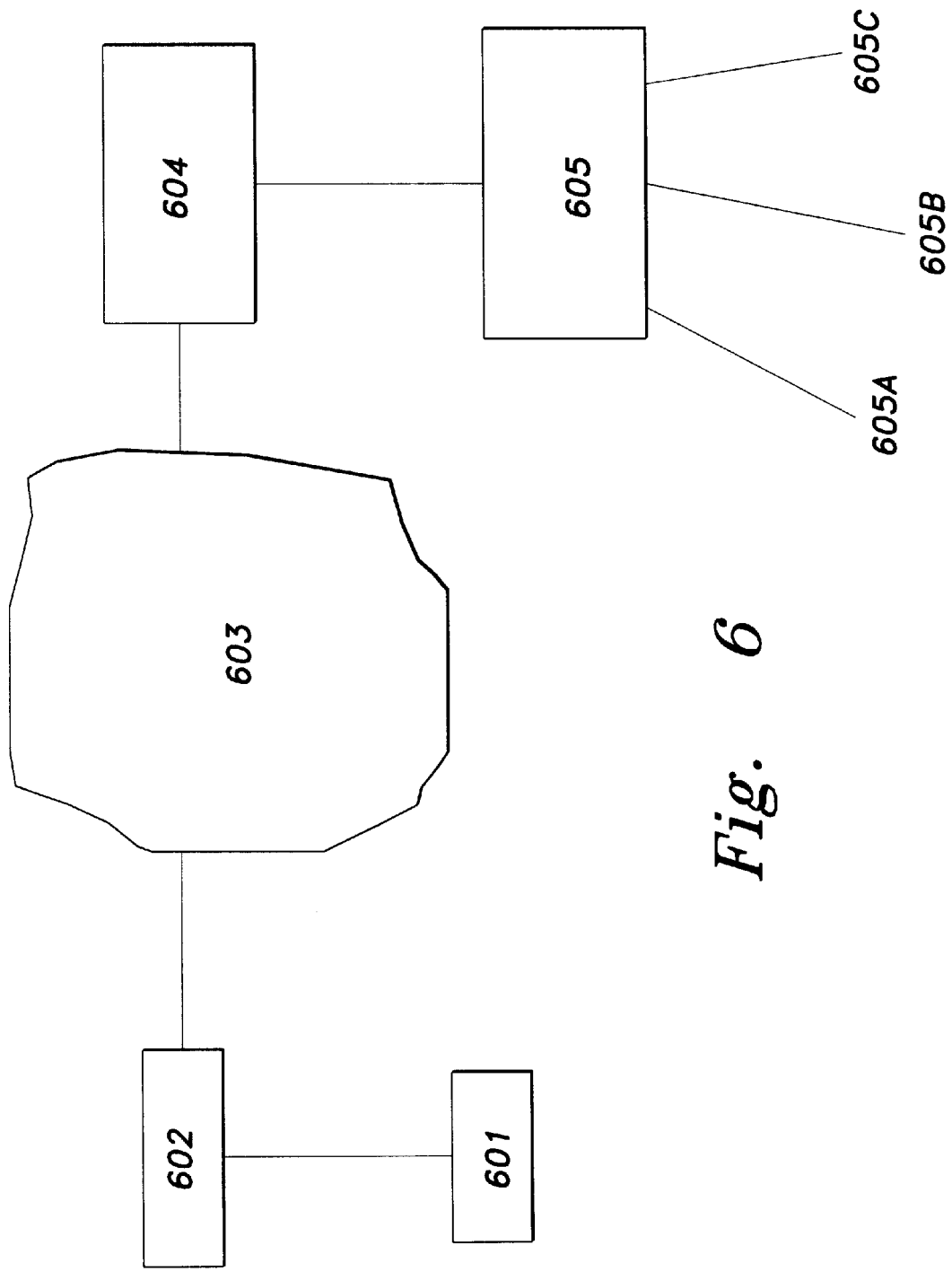
FIG. 6 is a schematic diagram of the relationship of the IPVPA system with an access provider such as the Internet Protocol Telephony Gateway® (IPTG), the Public Switched Telephone Network® (PSTN), the Internet, and the Internet Telephony Service Provider® (ITSP).

Referring to FIG. 6, the IPVPA device 601 (equivalent to devices 100 and 401) has to work with an Internet protocol telephony gateway (IPTG) 605 located at the Internet telephony service provider's (ITSP) premise. This IPVPA is connected to the IPTG via the cable or the asynchronous digital subscriber line (ADSL) access network 603. At the customer's premise, a cable modem or an ADSL modem 602 is used to connect to the access network, while at the carrier's end, a cable modem termination system or an ADSL access multiplexer system 604 is used. This IPTG 605 is the IPVPA's (601) bridge to other IPVPA's on the (1) same ITSP network, (2) on a different ITSP network, or (3) to a public switch telephony network (PSTN). An IPVPA is assigned a 10-digit telephone number consisting of a 3-digit area code number, a 3-digit exchange code number and a 4-digit subscriber code number. The IPTG carries out the address translation by converting an IPVPA's assigned telephone number to its dynamic internet protocol (IP) address, such that all signaling messages, voice frames, and video frames will be directed to this specific IP address.

The calling procedure on the IPVPA device 100 is similar to that of a cellular phone. The caller first uses the numeric keypad 101 to enter a 7-digit destination telephone number (if same area code area) or a 10-digit destination number (if a different area code in the U.S.A. or Canada). The caller starts with either a "1", an arbitrary length international destination number starting with "011", or an arbitrary length service number as a "0", "411", "911" and the like. Each entered digit will be displayed on the LCD 301 screen (FIG. 3). After entering all the required digits, the caller can press the "SEND" button 102 (FIG. 1) to start the call. If a mistake is made when entering a digit, the caller can use the "CLEAR" button 107 to remove the incorrect digit. Inside the IPVPA device 100, after receiving all the digits in the form of dual tone multiple frequency (DTMF) tones from the input 404A (FIG. 4), the analog phone interface module (APIM) 404 passes the destination number to the call processor 407, which formulates a standard based call setup message and transfers the message to the packetizer 408. The packetizer 408 first establishes a transmission control protocol (TCP) connection—a connection oriented protocol on top of the IP—between the IPVPA 601 (FIG. 6) and the internet protocol telephony gateway (IPTG) 605 for the purpose of setting up this telephone call. The packetizer 408 then transmits the message into the TCP pipeline and into the network via the network interface unit 410.

When the IPTG 605 (FIG. 6) receives the call setup message, examines the destination number through a table look-up and determines where to forward this message. The address can be a number in the PSTN 605A, a number in the ITSP's own network 605C, or a number in a different ITSP network that has to be reached via the public internet 605B. The IPTG 605 examines the area code and the exchange number and determines the end point of the telephone call. If the call is routed to the PSTN 605A, the IPTG 605 will use its computer telephony interface (CTI) hardware to make the call to the destination number. If the call is directed to another IPVPA device in the same network, the IPTG 605 will establish a TCP (transmission control protocol) connection to the destination IPVPA device and route the call to that IPVPA device via either the cable modem termination system (CMTS) or the digital subscriber line access multiplexer (DSLAM) 604 system. On the other hand, if the IPTG 605 cannot determine the IP address of the destination number, the address is likely to be an IPVPA or telephone not covered by this ITSP. Based on the area code, the IPTG 605 will set up a TCP connection with a remote IPTG and pass the signaling message along, anticipating that the remote IPTG will complete the last leg of the connection. In the worst case scenario, if the destination number is not covered by any ITSP, e.g., an overseas number, the local IPTG may have to route the call to a regular long distance carrier, similar to the situation of a local PSTN.

Once the IPVPA device 100 is powered on, the device waits indefinitely for incoming calls. Upon receipt of a call from another party, the device 100 will ring through its internal speaker 302 (FIG. 3). With an incoming call, a TCP connection is first established between the IPTG 605 and the destination IPVPA device 601. Inside the called IPVPA device 100, the packetizer unit 408 (FIG. 4) receives the TCP message via the network interface unit (NIU) 410 and passes the message to the call processor (CP) unit 407. Upon detecting a call setup attempt, the CP unit 407 will notify the analog phone interface module (APIM) 404 which produces an incoming call ringing tone and sends the call to the speaker 302 via output 404B. Simultaneously, the CP unit 407 sends an "alerting" message back to the call originator. If the call originates from another IPVPA device, the originating IPVPA'S CP unit 407 will receive this "alerting message" from the destination IPVPA and notify the originating IPVPA's APIM 404 which will send a remote alerting tone to its speaker 302. This remote alerting ring indicates that the remote phone is ringing.

At the destination end, if the call recipient answers the phone, by pressing the "ON" button 104, the ringing tone will stop. In the called IPVPA device, the CP unit 407 will send a "connected" message to the calling IVPVA 100. This connected message will also stop the alerting ring at the calling side.

Upon being connected, the originating IPVPA device and the destination IPVPA device begin negotiating resources. The resource negotiation at this stage includes: (1) the type of call, (a) audio plus full-duplex video, (b) half-duplex video, or (c) no video; (2) the type of codecs (a) video or audio, (b) frame rate, and (c) frame size. If the call is between 2 IPVPA's, they negotiate via the IPTG. If the call is between a PSTN phone and IPVPA, the IPTG represents the PSTN phone in the negotiation. Assuming that both parties have agreed on the resources, the voice path and an optional video path will be established for this call session. Resource negotiation is part of the communication protocol.

In the event of an IPVPA calling a PSTN 605A phone, the IPTG 605 acts as an agent of the PSTN 605A phone in call-setup and resource negotiation. Using its CTI (computer telephony interface) hardware, the IPTG 605 calls the destination phone number, while sending the same "alerting" message back to the originating IPVPA device. Once the call recipient picks up the phone, the IPTG 605 realizes that the call is connected, and sends a "connected" message back to the originating IPVPA device.

Upon establishing a connection, a full-duplex voice path is created to transmit the audio signals. For a call between a PSTN phone and an IPVPA device, or between 2 IPVPA devices, but with neither party having a video camera, only an audio call is possible. The end user uses the microphone 503 (FIG. 5) to speak. In the IPVPA device, the audio conversion module 402 receives the audio input 402A and converts it to a digital form. The digital audio signals are passed on to the audio compression module 406 which performs the functions of voice compression/decompression, silence detection, echo cancellation, and extrapolation. The compressed voice frames are passed on to the packetizer 408 which formulates the voice frames into real-time protocol (RTP) packets to include information such as sequence numbers and time-stamps. The RTP voice packets are formulated into user datagram protocol (UDP), a connectionless protocol which does not guarantee delivery, on top of the IP layer packets. These packets are sent to the network via the NIU 410 (network interface unit).

In the IPVPA device at the other end of this call, the NIU 410 receives voice packets from the network 410A. The voice packets are passed to the packetizer 408 which strips the packet headers and passes the voice frames to the audio compression module 406 which decompresses the voice signals and passes them to the audio conversion module 402. Upon converting the digital voice signals back to the analog form, the voice signals are forwarded to the television set 501 (FIG. 5) via the voice output 402B.

If the remote side of this call is made from an ordinary PSTN phone, the voice path is only established between the IPVPA device and the IPTG 605 that bridges the call to the PSTN. All the functions carried out in the IPVPA device are then performed in the IPTG 605 before the analog voice signals are transmitted to the PSTN connection via the IPTG's computer telephony interface (CTI) hardware.

In conjunction with the voice signal path, full-duplex video is also established if both parties are equipped with video equipment. The establishment of the video signal path is similar to the establishment of the aforementioned audio signal path. The end-user employs a video camera 502 (FIG. 5) to capture the video images. In the IPVPA device 100, the video conversion module 403 receives the video signals from input 403A and converts the signals to a digital form. The digital video signals are passed to the video compression module 405 which compresses the video signals based on a chosen format. The compressed video frames are passed to the packetizer 408 which synchronizes the video frames with the audio frames. The video and audio frames are separately formulated into real-time protocol and user datagram protocol packets. The two separate streams are then sent to the network via the network interface unit 410. However, the audio and video frames are not multiplexed together to form a single media stream, because a video frame takes up much more bandwidth than an audio frame. If a video frame is delayed or lost in a busy network, but its simultaneous audio frame reaches the intended destination, at least the audio frames can be played back.

In the IPVPA device at the other end of the call, the network interface unit 410 receives the video packets from the network input 410A. The video packets are passed to the packetizer 408 which strips the packet headers and passes the audio frames to the audio compression module 406. The audio compression module 406 decompresses the audio frames which are passed on to the audio conversion module 402. Upon conversion of the audio signals back to the analog form, the audio signals are passed on to the audio input of the television set 501 via output 402B. Simultaneously, the packetizer 408 passes the video frame of the same sequence number to the video compression module 405 which decompresses the video frame and passes it to the video conversion module 403. Upon conversion of the video frame back to analog form, the video frame is passed to the video input of the television set 501 via output 403B.

To disconnect a call, a user presses the "END" button 103. Upon receiving the "on-hook" signal from input 404A, the analog phone interface 404 sends the signal to the call processor 407. The call processor formulates a standard-based "disconnect call" message and sends it back to the packetizer 408 which sends the message to the remote side through the transmission control protocol pipe established during the call setup via the network interface unit 410. Simultaneously, the packetizer 408 also notifies the audio compression module 406 and the video compression module 405 to stop the compression processes.

If the remote side is another IPVPA device, upon receiving a "disconnect" message, the packetizer 408 passes the message to the call processor 407. The packetizer 408 notifies the audio compression module 406 and the video compression module 405 to stop the compression processes. Then the call processor 407 formulates a "disconnect acknowledgment" message. The "disconnect acknowledgment" message is forwarded to the packetizer 408 which sends the message to the IPVPA device that initiated the disconnection via the network interface unit 410.

If the remote side is an ordinary PSTN phone, the "disconnect" message is received by the IPTG that bridges the data network and the PSTN. The IPTG disconnects the phone line on the PSTN side, and sends a similar "disconnect acknowledgment" message to the IPVPA that initiated the disconnection.

For video telephony, the performance of the session depends on the bandwidth available. The IPVPA device, when operated under the infrastructure of a cable modem or an ADSL, assumes that a realistic bandwidth from 375 Kbps (ADSL) to 2.5 Mbps (cable modem) are available to access the network. If the call is between two subscribers of the same cable or ADSL network, the bandwidth is likely to be available since they are in the same access network. If the phone call is between two subscribers of the same ITSP but are thousands of miles apart, the ITSP may have a private data network to provide the required bandwidth. However, if the two parties are to be connected via the public Internet, a busy network may adversely affect the quality of the video phone session. Fortunately, advances in network technologies, network business models, e.g., bandwidth on demand, as well as communication protocols like ReSerVation Protocol (RSVP) and guaranteed quality of service in the lower network layers will improve this situation in the future. Given that the common intermediate form (CIF) video has a resolution of 288×356 pixels at 30 frames/sec., full uncompressed video may require a bandwidth of 36.5 Mbps. If a bandwidth is not guaranteed, H.263, a variable bit rate codec which can compress video to less than 64 Kbps is likely to be the choice. If bandwidth of at least 375 Kbps is available, then H.261 which offers a compression range from 56 Kbps to 2 Mbps is preferable. If an abundance of bandwidth in excess of 2 Mbps is available, MPEG-2 compression of 2 Mbps to 8 Mbps can be considered. Since compressed audio usually requires a bandwidth of less than 10 Kbps, in a busy network, audio transmission takes precedence over video transmission. Audio frames can be transmitted at the same rate, but the video frames will necessarily be transmitted at a reduced rate of less than 30 frames/second.

The present invention contemplates that optimum bandwidth ranges of 375 Kbps to 27 Mbps downstream and 125 Kbps to 10 Mbps upstream are preferred for the IPVPA device. It is known that the least expensive bandwidths presently available are 125 Kbps upstream and 375 Kbps downstream, but the video and audio signals are drastically affected.

Thus, there is a need for the present invention operating at a high bandwidth for an economical system operating on the Internet or any global information network.

It is to be understood that the present invention is not limited to the embodiments described above, but encompasses any and all embodiments within the scope of the following claims.

I claim:

1. A global information network protocol video phone system with high bandwidth access consisting essentially of:
   a television set;
   a videocassette recorder;
   a video camera or a camcorder;
   a cable or an asynchronous digital subscriber line modem;
   a microphone;
   a global information protocol video phone adapter device comprising:
      a housing having a top side, a front side, and a rear side;
      a numeric keypad, an outbound call button, a call termination button, an on/off button, a number storing button, a restoring number button, and a clearing number button positioned on the top side of the housing;

a liquid crystal display means and a speaker means positioned on the front side of the housing;

a jack means for connection to a modem selected from the group consisting of an asynchronous digital line means and a cable means, said lack means comprising a video output jack means, a video input jack means, an audio output jack means, an amplified audio input jack means, an unamplified audio input jack means, and an electrical power means positioned on the rear side of the housing; and a selected high bandwidth speed range of 375 Kbps to 27 Mbps downstream and 125 Kbps to 10 Mbps upstream for operation of the device;

whereby a caller can call others and receive calls on a global information network system based on a high bandwidth for enhanced reception of signals.

2. The global information network protocol video phone system with high bandwidth access according to claim 1, wherein the modem is a cable modem.

3. The global information network protocol video phone system with high bandwidth access according to claim 1, wherein the modem is an asynchronous subscriber line modem.

4. The global information network protocol video phone system with high bandwidth access according to claim 1, including a video cassette recorder in the system.

5. A global information network protocol video phone device with high bandwidth access consisting essentially of:

a housing having a top side, a front side, and a rear side;

a numeric keypad, an outbound call button, a call termination button, an on/off button, a number storing button, a restoring number button, and a clearing number button positioned on the top side of the housing;

a liquid crystal display means and a speaker means positioned on the front side of the housing;

a jack means for connection to a modem selected from the group consisting of an asynchronous digital line means and a cable means, said jack means comprising a video output jack means, a video input jack means, an audio output jack means, an amplified audio input jack means, an unamplified audio input jack means, and an electrical power means positioned on the rear side of the housing; and a selected high bandwidth range having a high bandwidth speed range of 375 Kbps to 27 Mbps downstream and 125 Kbps to 10 Mbps upstream for operation of the device;

whereby a caller can call others and receive calls on a global information network system based on a high bandwidth for enhanced reception of signals.

6. The global information network protocol video phone device with high bandwidth access according to claim 5, wherein the modem is a cable modem.

7. The global information network protocol video phone device with high bandwidth access according to claim 5, wherein the modem is an asynchronous subscriber line modem.

* * * * *